United States Patent [19]

Barat

[11] 4,345,478
[45] Aug. 24, 1982

[54] GAS FLOW MEASURING DEVICE

[75] Inventor: Jean Barat, Verrieres les Buisson, France

[73] Assignee: Metraflu, France

[21] Appl. No.: 169,956

[22] Filed: Jul. 18, 1980

[30] Foreign Application Priority Data

Jul. 18, 1979 [FR] France ............................. 79 18653

[51] Int. Cl.³ .............................................. G01F 1/64
[52] U.S. Cl. .................................. 73/861.09; 73/189
[58] Field of Search ............................ 73/189, 861.09

[56] References Cited

U.S. PATENT DOCUMENTS 2,611,268  9/1952  Mellen ............................. 73/861.09
3,374,672  3/1968  Horne .............................. 73/861.09
3,768,308  10/1973 Neradka ............................... 73/189
3,996,795  12/1976 Servassier ......................... 73/861.09

Primary Examiner—Herbert Goldstein
Attorney, Agent, or Firm—Remy J. VanOphem

[57] ABSTRACT

The invention concerns the measurement of one or two components of the speed vector of a gas flow, in particular the projection in one plane of this vector.

The device comprises a section of conducting wire brought to a high electrical potential by a high voltage source. This wire is surrounded by one or two pairs of conductors. The conductors of each pair being arranged symmetrically in relation to the wire. The difference in voltage between the two conductors of each pair is determined to provide the speed and the direction of the flow of gas.

6 Claims, 9 Drawing Figures

GAS FLOW MEASURING DEVICE

FIELD OF THE INVENTION

The present invention concerns the measurement of the speed vector of an ionizable gas flow. It is aimed mainly at achieving the simultaneous measurement of the algebraic components of this vector in two directions, at right angles to each other or inclined the one to the other.

BACKGROUND OF THE INVENTION

The invention allows the local and quasi-instantaneous measurement of a speed vector of an ionizable gas flow in its plane of measurement. In addition, it permits the determination of the vorticity (the local and temporal variation of the speed vector of flow), which was difficult, if not impossible, to achieve with previous devices.

The invention brings into play the creation of ions in the gas flow by the corona effect, and the measurement of the influence of the said speed vector on the movement of these ions.

There are several existing apparatus for measuring the gas flow, in fact of a component of the latter, bringing into play the ions produced by the corona effect. These apparatus are divided into two classes:

the class of apparatus in which the jet of ions is perpendicular to the speed of flow, in which the beam of ions is displaced to a greater or lesser degree from a first collecting electrode to a second collecting electrode, the source of ions and the two collecting electrodes (placed side by side) being arranged on either side of the jet which serves to measure the speed; and the class of apparatus in which the jet of ions is parallel to the speed of flow, making use of grilles of which one emits the ions and the other or others collect ions, the flow of gas passing successively through these parallel grilles; by way of example, it is possible to cite the French Pat. No. 2.250.981 filed on the 13th of November 1973 by Monsieur Jean Zizine.

In the aforementioned two classes of apparatus, the measurement of the average speed of a flow is achieved, namely the flow which passes between the source of ions and the collecting electrodes in the apparatus with the jet of ions perpendicular to the flow or that which passes through the grilles in the apparatus with the jet of ions parallel to the flow.

SUMMARY OF THE INVENTION

As the device according to the invention allows the achievement of a rapid local measurement of the speed vector in two directions, without requiring any particular relative orientation between the jet of ions and the flow of fluid in the plane of measurement.

The invention has for a first objective, the provision of an elementary device for measuring a component of the speed vector of an ionizable gas flow. The device has a section of conducting wire, means for bringing the said section of wire to a high electric potential in order that it may produce ions by the corona effect around its periphery, a pair of conductors arranged parallel to the said section of wire and at equal distance from it. The two conductors are placed symmetrically in relation to the said section of wire. Finally, means of determining the difference of current between the two conductors resulting from the collection by those conductors of ions emitted by the said selection of wire is provided.

The invention has likewise the object of providing a device for the simultaneous measurement of two components of the speed vector of an ionizable gas flow. The device has a section of conducting wire, means for bringing the said section of wire to a high electrical potential so that it produces ions by the corona effect around its periphery, at least two pairs of conductors arranged parallel to the said section of wire and at equal distance from it. The two conductors of each pair are placed symmetrically in relation to the said section of wire. Finally means for determining the difference of current between the two conductors of each pair resulting from the collection by these conductors of ions emitted by the said section of wire are provided.

For preference, the device likewise carries means for determining the sum of the currents of the two conductors of the pair or of each pair of conductors and means for establishing the relationship, for the pair or each pair, between the said difference of current and the said sums of current.

In the case of a device with two pairs of conductors, in a preferred method of manufacture, the plane containing the two conductors of the first pair is perpendicular to the plane containing the two conductors of the second pair, these two planes cutting each other along the axis of the said section of wire.

In another method of manufacture, these two planes instead of being perpendicular to each other are oblique in relation to each other.

BRIEF DESCRIPTION OF THE DRAWINGS

The invention may in any case be well understood with the help of the complementary description which follows, as well as of the attached drawings, which description and drawings are, naturally, given by way of indication.

DESCRIPTION OF THE PREFERRED EMBODIMENTS

According to the invention and more particularly according to its methods of applications, as well as to the methods of construction of its various parts, to which it seems reasonable that preference should be given, if it is proposed, for example, to construct a device for measuring a single component or the simultaneous measurement of two components of the speed vector of a gas flow, the following, or similar procedure is carried out.

First of all, referring to FIGS. 1 to 5, the invention will be explained by an elementary device comprising a single pair of collecting conductors or electrodes arranged symmetrically in relation to a section of wire constituting the source of ions.

Figures 1, 2, 3, 4:
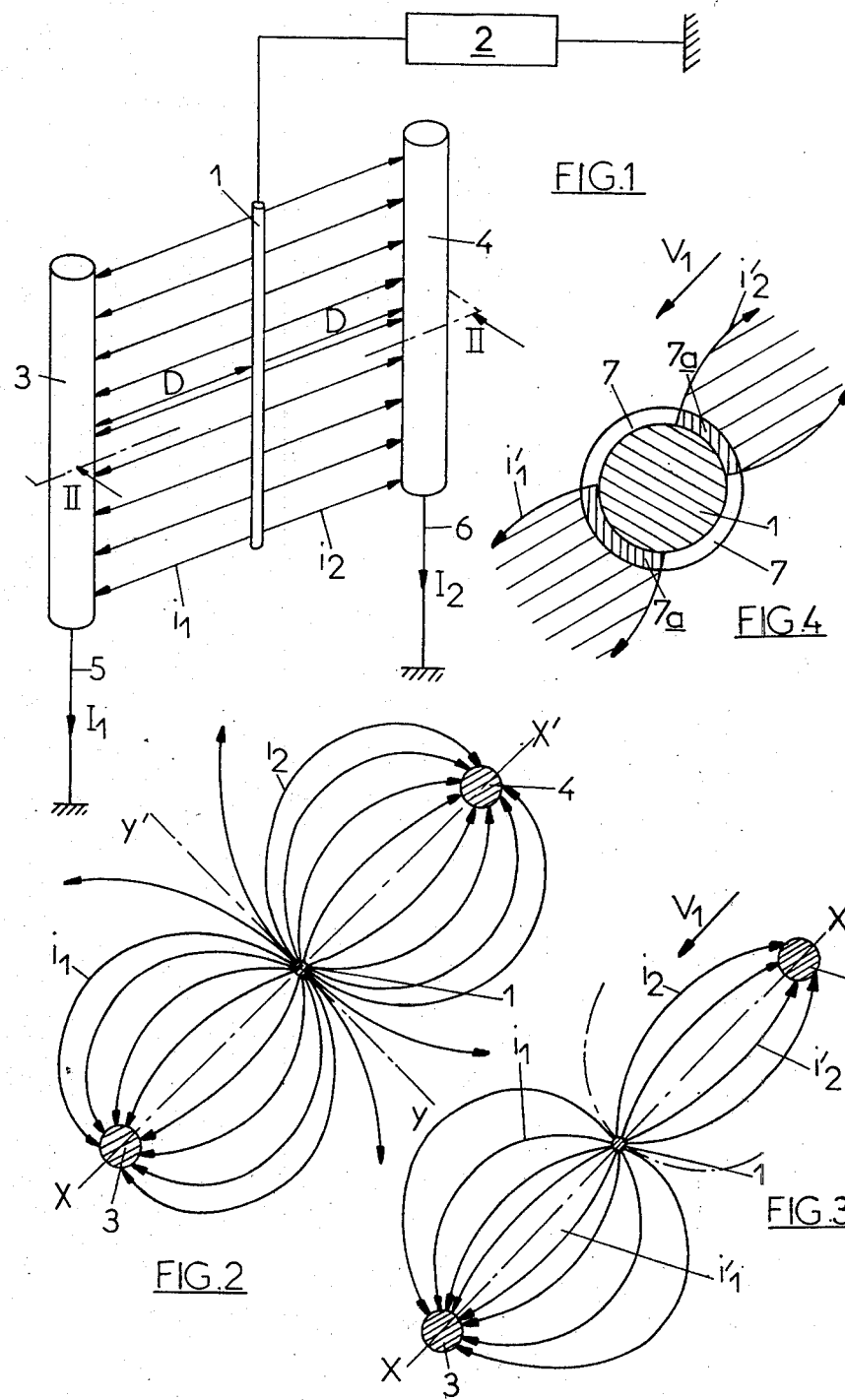
FIG. 1 describes a device according to the invention illustrating the section of wire producing ions and a pair of single conductors.
FIG. 2 describes the path of the ions in the absence of gas flow taken along II—II of FIG. 1.
FIG. 3 describes the path of the ions of FIG. 2 in the presence of gas flow.
FIG. 4 describes the path of the ions adjacent to the conducting wire.

FIG. 1 shows such a device in perspective, with a section 1 of conducting wire brought by a high voltage source 2 to a high electrical potential, for example of several thousands of volts. The wire 1 has a very small diameter, for example of the order of a few tens of microns. Due to its fineness and the high voltage potential which is applied to it, this conducting wire 1 will emit ions through the corona effect when it is placed in a gas flow.

On either side of the wire 1 and symmetrically in relation to it are arranged two conductors 3 and 4 of greater diameter, for example of the order of one millimeter, which will collect part of the ions emitted by the wire 1. This gives rise to the passage of currents $I_1$, $I_2$ in the wires 5 and 6 connecting the conductors 3 and 4 respectively to earth.

The distance D between the wire 1 and each conductor 3, 4 is large in relation to the diameter of the wire 1, for example equal to 100 times the diameter of the wire 1.

The wire 1 may be made from stainless steel, tungsten, platinum or German silver, while the conductors may be made from stainless steel, copper, platinum or German silver.

In FIG. 1, the ions emitted by the wire 1 and moving towards the conductors 3 and 4 respectively are shown diagrammatically by arrows $i_1$ and $i_2$. $I_1$ and $I_2$ are the respective sums of the "elementary ion currents" of the ions $i_1$ and $i_2$.

The FIG. 2, which is a section along the plane II—II of FIG. 1, will permit the phenomenon to be better explained.

The zone of ionization which surrounds the wire 1 will emit some ions $i_1$ in the direction of the arrows, so they reach the collecting conductor 3, and some ions $i_2$ which reach the collecting conductor 4. In the absence of all movement of the gas in which the elementary cell in FIG. 1 is immersed (or more exactly of component in the plane of section II—II, parallel to the plane defined by 1, 3, 4), FIG. 2 is symmetrical both in relation to the axis XX′ passing through the parts 1, 3, 4, and to the axis YY′ perpendicular to XX′ and cutting XX′ at the center of the wire i in the plane II—II. In this case, the currents $I_1$ and $I_2$ will be identical, the electrodes 3 and 4 collecting the same number of ions per second. If, as shown in FIG. 3, (which is likewise a section along II—II of FIG. 1), the device in FIG. 1 is immersed in a current of gas of which the speed, in the plane II—II, has a component $V_1$ parallel to the axis XX′ in the direction from X′ to X, the ions which leave the wire 1 are carried by the component $V_1$ of the speed. The ions such as $i'_1$ and $i'_2$, of which the trajectories are adjacent to the axis XX′, are not appreciably affected (their speed simply increases for ions $i'_1$ and diminishes for the ions $i'_2$). On the other hand, the trajectories of the ions which pass the furthest from the axis XX′ are affected: when the intensity of $V_1$ increases, an increasing number of ions which would be moving towards the electrode 4 in the absence of $V_1$, will move towards the electrode 3 (in FIG. 3 a number of trajectories of ions $i_1$ greater than the number of trajectories of ions $i_2$ is shown). The result is therefore, that $I_1$ will be greater than $I_2$, the difference $I_1$-$I_2$ increasing with the intensity of $V_1$.

It will be seen, therefore, that the device in FIG. 1, with one pair of collecting conductors 3 and 4, arranged on either side and at equal distance from the emitting wire 1 brought to a high electrical voltage potential, allows the intensity of the component along the axis XX′ of the speed of flow of the gas in which this device is placed to be determined. It will be easily understood that if another pair of conductors is arranged identical to the pair of conductors 3, 4, but such that the plane of the conductors of this other pair makes an angle (for example of 90°) with the plane of the conductors 3, 4, (as in the case for a device with two pairs of conductors shown in FIGS. 7 and 8), it will be equally possible to determine the component of the speed of movement of the fluid in a direction $V_2$ making an angle (for example of 90°) with $V_1$ in the plane I—I, and therefore to determine the projection $\vec{V'}$ of the speed of movement along the plane I—I.

One of the advantages of the device of FIG. 1 with one pair of conductors over previous known devices, is that the present device allows the exact measurement of the intensity and the direction of a component (and a device with two pairs of conductors allows, as shown above, the projection $\vec{V}$ in the plane II—II to be obtained). In addition, it allows the determination of a local speed, in fact the speed level with the section of wire 1. As is seen in FIG. 4, the zones $7a$ on the periphery of the wire 1 are not affected by $V_1$, the trajectories of the ions of types $i'_1$ or $i'_2$ not being appreciably changed by $V_1$. However, only the zones 7 of the periphery of the wire 1 are affected. The ions which leave zones 7 moves either equally towards conductors 3 and 4 in the absence of a component of the speed of movement of gas flow along the axis XX′ (FIG. 2), or towards the conductor 3 if $V_1$ is directed from X′ towards X (FIG. 3), or, finally, rather towards the conductor 4 if the component of the speed of flow along the axis XX′ is directed from X towards X′.

The difference $I_1$-$I_2$ is therefore representative of the direction and of the intensity of the component of the speed of movement of the gas, in which the device of FIG. 1 is immersed, along the axis XX′.

Figure 5:
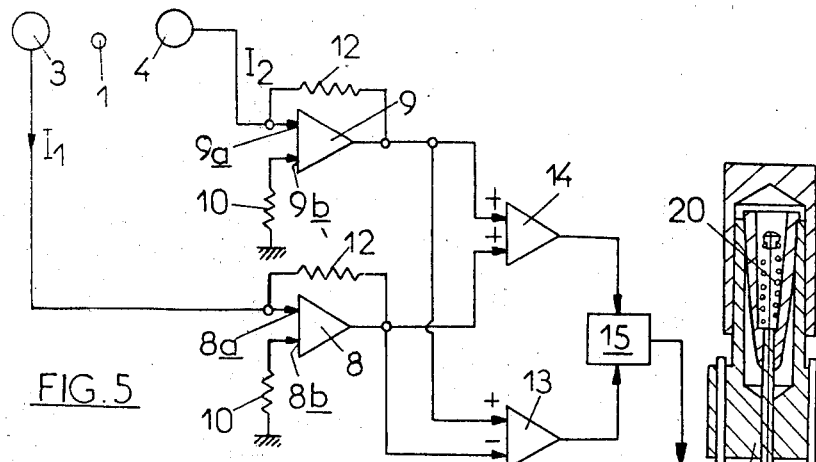
FIG. 5 illustrates a method of construction of the electronic assembly of the means which allow the determination of a component of the speed of flow from the currents created in a pair of conductors.

It will now be seen, with reference to FIG. 5, how it is possible effectively to determine the component along XX′, such as $V_1$ (FIG. 3). In FIG. 5 the wire 1, the conductors 3 and 4 and the currents $I_1$ and $I_2$ are shown again.

The conductor 3 is connected to the first entry $8a$ of an operating amplifier 80, while the conductor 4 is connected to the first entry $9a$ of another operating amplifier 9, the second entries $8b$, $9b$ of these amplifiers is connected through equal resistors 10 to earth; finally reaction resistors 12 are provided.

The output of the two operating reaction amplifier assemblies, proportional to $I_1$ and $I_2$ and therefore to the ions collected by the conductors 3 and 4 per unit of time, are subtracted in the differential amplifier 13 and added in the adding amplifier 14. The output of the amplifiers 13 and 14 are then treated in a unit 15 carrying out the division of the output of 13 by the output of 14. The output 16 of the unit 15 is therefore proportional to $$\frac{I_1 - I_2}{I_1 + I_2}.$$

It is therefore sufficient to calibrate the apparatus to determine the intensity of $V_1$ as a function of the output of the unit 15, for this output is an increasing function of the intensity of $V_1$.

Finally, it will therefore be seen that a device of the type shown in FIG. 1, combined with the electronic assembly of FIG. 5, allows $V_1$ to be determined.

Figure 7:
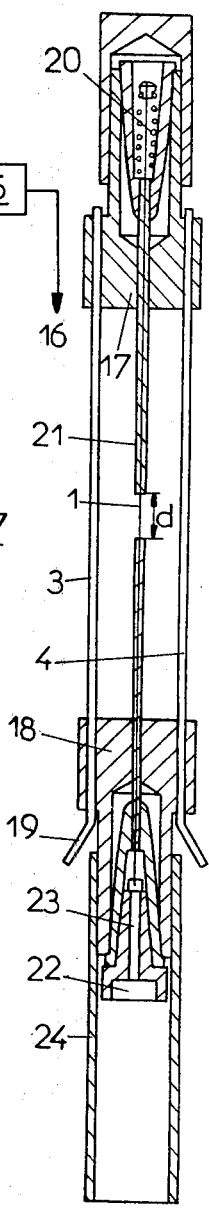
FIGS. 7 and 8 represent two methods of construction of a device with two pairs of conductors which has the improvements according to the invention, the planes each containing a pair of conductors being perpendicular (FIG. 7) or oblique (FIG. 8) to each other.
Figure 8:
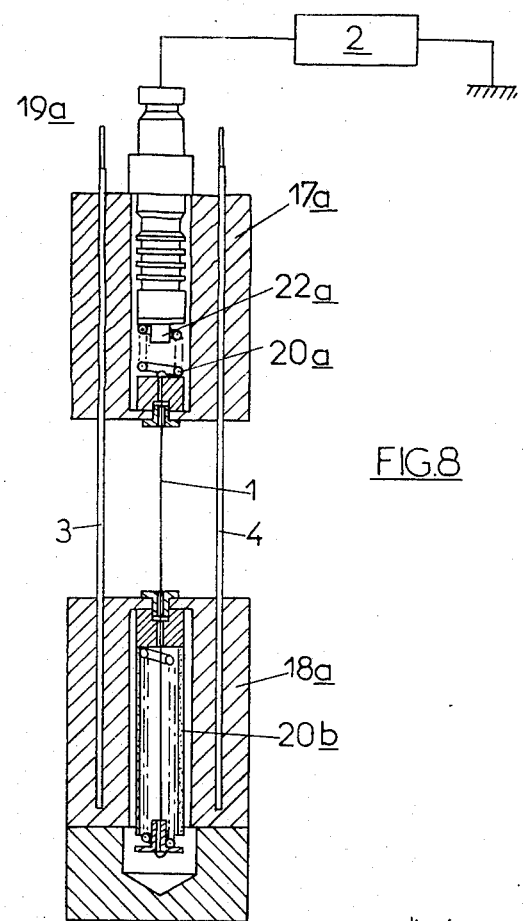
Figure 9:
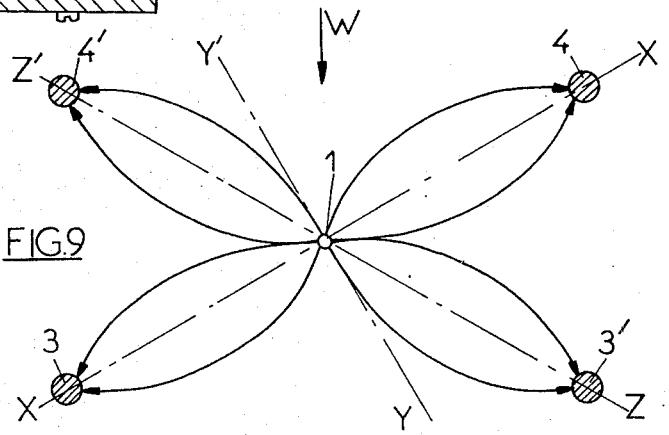
FIG. 9, finally, is similar to FIG. 6, but in the case in which the two pairs of conductors are not perpendicular to each other.

It will now be explained how it is possible to construct and operate a device according to the invention with two pairs of conductors, that is to say having two units according to FIGS. 1 and 5, either with two pairs of conductors at right angles (FIGS. 6 and 7) or with two pairs of conductors inclined in relation to each other (FIGS. 8 and 9).

Figure 6:
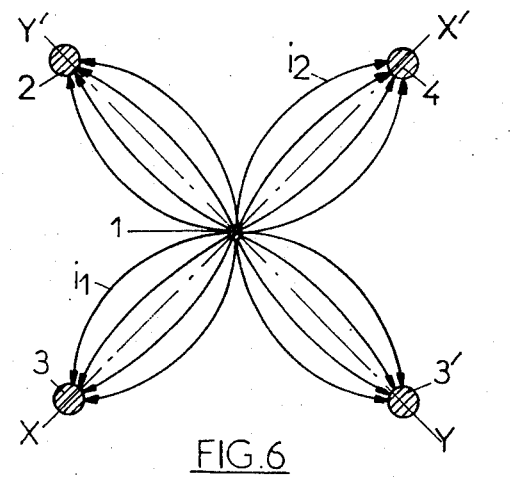
FIG. 6 illustrates diagrammatically what happens in the case of a device according to the invention having two pairs of conductors perpendicular to each other.

Reference will first be made to FIGS. 6 and 7. The device shown (FIG. 6) has a section of wire 1 arranged between two pairs of conductors 3, 4 and 3', 4'. The planes 3, 4 and 3', 4' with axes XX' and YY' respectively intersect at right angles along the wire 1.

The conductors 3 and 4 are connected to an electronic assembly of the type shown in FIG. 5, allowing the determination of the component of $\vec{V}$ along XX' similarly, the conductors 3' and 4' are connected to an electronic assembly of the same type, allowing the determination of the component of V along YY'; the assembly therefore allows the determination of the direction, the course, and the value of $\vec{V}$.

The method of construction shown in FIG. 7, given by way of non-limiting example, is as follows.

The section of wire 1 and the conductors, 3, 4, 3', 4' are carried by two insulating components 17 and 18, one of the ends 19 of the conductors 3, 4, 3', 4' being curved and serving as connection to the operating amplifiers 8 and 9. A spring 20 allows the tensioning of the wire 1 which is carried by an insulating sheath 21 in such a way that only a small zone, of length d, of the wire 1 is active, that is to say ionizing. The high voltage is applied to the connection 22 which is joined by a conductor 23 to the wire 1. An insulating sheath 24 allows the high voltage conductor to be brought to the connection 22.

By giving the sheath 21 a greater or lesser length, the volume of measurement of the probe, that is to say the length d (FIG. 7) may be adjusted. The advantage is as follows: this allows, in a turbulent flow, the detection of turbulent structures of which the dimensions are of the order of d.

In the method of construction in FIG. 8, there are shown again the wire 1, the conductors 3, 4, 3', 4' (see FIG. 9 which corresponds to a transverse section of FIG. 8). The output of the conductors 3, 4, 3', 4' are available at 19a and the high voltage may be applied at 22a from a high voltage source 2. In the assembly in FIG. 8, two similar insulating components 17a, 18a are provided in which are fixed to the wire 1 on the one hand and the conductors 3, 4, 3', 4' on the other. The springs 20a and 20b allow the wire 1 to be tensioned.

In FIG. 9 it will be seen that the plane XX' of the conductors 3 and 4 and the plane ZZ' of the conductors 3', 4' are not perpendicular but oblique in relation to each other. In this case the components of V, the projection of the speed of flow on the plane of FIG. 9, will be determined, not in two directions at right angles, XX' and YY', as in the case of FIG. 6, but in the directions XX' and ZZ' which are not at right angles.

The FIGS. 8 and 9 therefore show that the angle between the planes of the conductors 3, 4 and 3', 4' is not necessarily equal to 90°. The assembly in the FIGS. 8 and 9 may be advantageous in the case when the main component of $\vec{V}$ is in the direction W (parallel to the line bisecting the greater angle formed by the axes XX' and ZZ'), for in this case the flow penetrates more easily into the zone determined by the conductors 3, 4, 3', 4'.

It will be noticed that in all cases the conductors 3, 4, 3', 4' produce a very small disturbance in the gas flow, mainly in the vicinity of the wire 1 level with which the measurement is carried out, unlike that which happens in devices with jets of ions of the earlier prior art technique, for example that described in the earlier mentioned French Pat. No. 2.250.981 which carries grilles with numerous conductors.

It will be seen clearly that the device according to the invention allows the measurement of one or two components of a gas flow and principally the determination of V, the projection in a given plane (perpendicular to the axis of the device) of the speed of flow. The device gives a practical measurement of $\vec{V}$ at a given point, rapidly, and from the fact that a vectorial measurement is in question, allows the vorticity to be determined.

Its construction is simple and sturdy and inexpensive.

The device according to the invention allows, among others, all the measurements of wind, including turbulent winds, as well as the measurement of turbulence in forced air feeds.

As is evident and as a result moreover of the foregoing, the invention is in no way limited to those of its methods of application and of construction which have been specially detailed; on the contrary, it embraces all variants of them.

If the current of gas to be studied is not ionizable, it is sufficient to make it so before its passage into the device.

What is claimed is:

1. A device for the measurement of a component of the speed vector of an ionizable gas flow utilizing high electrical voltage potential, said device comprising:
   a linear section of conducting wire;
   means for applying said high electrical potential to said section of conducting wire to produce ions through the corona effect around the periphery of said section of wire;
   a pair of linear conductors for collecting the ions produced by said corona effect to generate ion currents, said pair of conductors arranged parallel to said section of wire and equally spaced on opposite sides of said wire; and
   means responsive to the difference in said ion currents generated at each of said pair of conductors as a result of collecting the ions emitted by said section of conducting wire to generate a signal corresponding to the speed vector of the ionizable gas flow.

2. A device for the simultaneous measurement of at least two components of the speed vector of a flow of ionizable gas utilizing high electrical voltage potential, said device comprising:
   a section of conducting wire;
   means for applying said high electrical voltage potential to said section of conducting wire to produce ions by the corona effect around the periphery of said section of conducting wire;

at least two pairs of conductors arranged parallel and equally spaced to said section of conducting wire, said at least two pairs of conductors having a first pair and a second pair of said at least two pairs of conductors, each of said at least two pairs of conductors having one conductor and another conductor, said first and said second pair of said at least two pairs of conductors further being placed symmetrically in relation to said section of wire; and means for determining the difference in electrical current between said one conductor and said another conductor of each of said at least two pairs of conductors from the collection by each of said at least two pairs of conductors of ions emitted by said section of conducting wire to measure at least two components of the speed vector of the flow of ionizable gas.

3. A device according to claim 2 further comprising means for determining the sum of the electrical currents of said one conductor and another conductor of each of said at least two pairs of conductors and means for establishing in each said at least two pairs of conductors the relationship between the difference of electrical current and the sum of electrical current.

4. A device according to claim 2 or claim 3, wherein the plane of said first pair of said at least two pairs of conductors is perpendicular to the plane of said second pair of said at least two pairs of conductors, the plane of said first pair and the plane of said second pair intersecting along the axis of said section of conducting wire.

5. A device according to claim 2 or claim 3, wherein the plane of said first pair of said at least two conductors is angularly inclined between 0 degrees and 90 degrees with the plane of said second pair of said at least two conductors, the plane of said first pair and the plane of said second pair intersecting along the axis of said section of conducting wire.

6. A device according to claim 2 further comprising:
means for determining the sum of the electrical current and the difference of the electrical current in each of said pair of conductors; and
means for establishing the relationship between the sum of the electrical current and the difference of the electrical current in each of said pair of conductors so as to determine the speed vector of the flow of ionizable gas.

* * * * *

UNITED STATES PATENT AND TRADEMARK OFFICE
CERTIFICATE OF CORRECTION

PATENT NO. : 4,345,478
DATED : August 24, 1982
INVENTOR(S) : Jean Barat

It is certified that error appears in the above—identified patent and that said Letters Patent is hereby corrected as shown below:

Column 4, line 4, After "is" insert - - - , - - -.

Column 4, line 55, Delete "80," and insert - - - 8, - - -.

Column 5, line 29, Delete "V" and insert - - - $\vec{V}$ - - -.

Column 5, line 66, Delete "V" and insert - - - $\vec{V}$ - - -.

Column 6, line 22, Delete "V" and insert - - - $\vec{V}$ - - -.

Signed and Sealed this

Ninth Day of August 1983

[SEAL]

Attest:

GERALD J. MOSSINGHOFF

Attesting Officer     Commissioner of Patents and Trademarks